United States Patent Office 3,420,644
Patented Jan. 7, 1969

3,420,644
METHOD FOR MOLDING OF GLASS AND CERAMIC MATERIALS
Nick G. Lirones, North Muskegon, Mich., assignor to Howmet Corporation, a corporation of Delaware
No Drawing. Filed Oct. 19, 1964, Ser. No. 404,976
The portion of the term of the patent subsequent to Aug. 16, 1983, has been disclaimed
U.S. Cl. 65—18      6 Claims
Int. Cl. C03b *19/00;* B29c *11/00*

ABSTRACT OF THE DISCLOSURE

A method for molding glass and ceramic articles wherein a mold is built up around a disposable pattern by means of alternating application of dip coat and stuccoing material. The improvements of the invention relate to the use of dip coat compositions comprising aqueous solutions of colloidal graphite and graphite flour. At least 50 percent of the colloidal graphite consists of particles of less than one micron while the balance of the colloidal graphite consists of particles of less than 20 microns. The stucco applied over the dip coat compositions consists of graphite particles, and the graphitic dip coat and stucco layers make up at least about half the cross section of the mold.

---

This invention relates to the molding of articles formed of glass and ceramic materials. The invention is particularly concerned with procedures for accomplishing the molding operation and with molds employed in carrying out these procedures.

There are many instances where molded articles formed of glass and ceramic materials are of value. For example, materials which must resist chemical action are advantageously formed of these materials since other materials such as plastics and metals are incapable of standing up under many circumstances. In addition, it is well known that glass and ceramic materials are capable of resisting the detrimental effects of high temperatures. Finally, operations which combine chemical action and high temperatures require the use of these materials in many instances.

Reference is made to chemical pump constructions as a typical example of an application for molded ceramic articles. In such constructions, impeller mechanisms and other parts are continuously in contact with chemicals passing through the pumps and where in the chemicals are of a corrosive nature, conventional pump elements would quickly fail. The need for materials such as ceramic which will resist the corrosive action, and which will do so at elevated temperatures is quite clear. Pyroceram is a typical material which, when molded into the shape of an impeller, can be used under the conditions described.

There are available procedures for molding articles of ceramic material. Such procedures have, however, been quite expensive and, since this expense adds to the cost of the articles produced, it is highly desirable to provide more efficient molding operations. Accordingly, it is the general object of this invention to provide improved systems for the molding of glass and ceramic articles.

It is a more particular object of this invention to provide a process for ceramic molding which enables the production of suitable molds in a highly efficient manner and which involves relatively simple steps in the course of the molding and article forming operations.

It is a further object of this invention to provide molds for the casting of ceramics which are manufactured with relative ease, which are inexpensive, and which can be employed in a highly efficient manner.

These and other objects of this invention will appear hereinafter, and it will be understood that the specific examples hereinafter set forth are provided solely for purposes of illustration and not by way of limitation.

In accordance with the procedures of this invention, molding of ceramic materials is accomplished by forming a disposable pattern corresponding substantially to the shape of the article to be molded. Thereafter, the pattern is immersed in a bath containing an aqueous dip coat. The material of the bath adheres to the pattern surface whereby a layer of the material is formed thereon. By employing appropriate drying procedures, the layer of material can be formed into a solid shell. Thereafter, the disposable pattern is removed from the shell and molten ceramic material is poured into the shell. Solidification of the ceramic material in the shell provides the desired molded article and the shell can be easily broken away from the surfaces of the article.

The basic concepts of this invention involve a particular type of bath for forming the layers on the pattern material. Specifically, the aqueous bath includes significant proportions of graphitic particles. Accordingly, when the desired layer is formed on the pattern and when the appropriate drying steps have been undertaken, the remaining shell will include graphitic particles. It will also be obvious that the interior surfaces of the shell will include the graphitic particles and that, after removal of the pattern, the molten ceramic will contact the graphitic surface.

As will appear when considering the following examples, the procedures of this invention provide for extreme improvements over conventional molding procedures. There is no need for the use of heavy, bulky and expensive molds for forming the ceramic articles. In addition, it has been found that the contact of the molten ceramic with the graphitic surfaces provides a finished product having improved surface characteristics. Accordingly, the procedures of this invention can be carried out at lower cost and with improved results, particularly when forming complex shapes.

In the systems of this invention, the pattern can be formed of conventional materials disposable by heat or chemicals in accordance with known investment casting processes. In one known procedure, patterns are molded under pressure by injecting molten wax into suitable metal molds. Alternative procedures can involve the use of any thermoplastic or synthetic resinous materials or combinations of such materials. Furthermore, the patterns can be manufactured whereby a plurality of the patterns are connected by runners for communication with one or more pouring spouts. The manufacture of patterns in clusters of this nature is described in Operhall et al. Patent No. 2,961,751.

The following comprises a suitable dip coat composition which is adapted to be directly applied to the pattern surfaces:

DIP COAT COMPOSITION

| | Percent by wt. |
|---|---|
| Solids of colloidal graphite (22% solids in aqueous medium—"Aquadag" of National Carbon Company) | 2.77 |
| Solids of graphite flour (less than 200 mesh) | 37.8 |
| Emulsifying agent (gum tragacanth) | 0.174 |
| Anionic wetting agent (sodium heptadecyl sulphate) | 0.00325 |
| Water, remainder. | |

As the colloidal graphite, use can be made solely of colloidal particles of graphite of less than 1 micron. For the purpose of reducing cost, use can be made of a combination of such colloidal graphite mixed with up to 50% by weight and preferably up to only 30% by weight of semi-colloidal graphite having a particle size of between 10–20 microns. The colloidal graphite functions in the dip coat composition as a suspension agent and is the binder component to hold the particles of the zirconia or alumina flour and the stucco until at least the time that the shell is fired at elevated temperature.

The amount of colloidal graphite in the dip coat composition may vary but it is desirable to make use of an amount greater than 0.5% by weight but less than 5% by weight and preferably an amount within the range of 1 to 3.0% by weight.

The dip coat composition of the example will have a pH within the range of 8.8 to 9.4 and a viscosity measured by the cup of Patent No. 3,011,986 of between 25–35 seconds.

In the dip coat composition of this invention, the emulsifying agents and the anionic wetting agents are preferred but not essential. Instead of gum tragacanth, use can be made of other hydrophilic colloids such as the gums, gelatins, alignates and the like, wherein, when used, such emulsifying agents are employed in an amount within the range of 0.01–0.5 percent by weight. Instead of the sodium heptadecyl sulfate wetting agent, other anionic surface active agents may be employed, such as the allyl sulfates and the allyl aryl sulfonates and their salts. When employed, the amount of such surface active agent may range from 0.01–0.5 percent by weight of the composition.

The solids content, insofar as the colloidal or semi-colloidal graphite and graphite flour is concerned, can be varied quite widely, it being necessary only to formulate for a viscosity that can be handled to wet out the pattern and to make use of colloidal or semi-colloidal graphite in an amount sufficient to achieve the desired bonding action. For this purpose, it is deemed sufficient if the latter is present in an amount to make up more than 1.5 percent by weight of the graphite solids of the dip coat composition, and it is usually undesirable and uneconomical to make use of an amount of colloidal or semi-colloidal graphite greater than 10 percent by weight of the graphite in the dip coat composition. It will be understood, however, that the essentially 100% graphite making up the solids in the dip coat composition can be achieved by the use of colloidal or colloidal and semi-colloidal graphite alone.

The instant invention contemplates the use of a slip as an initial dip coat which contains the graphite generally in combination with minute amounts of a suitable binder. The binder may be composed of the ceramic materials normally used in Patent No. 2,961,751 to form the mold. It is also contemplated that the graphite may be coated around ceramic particles and the coated particles used to form the dip coat slip although this is not always desirable.

1. Application of dip coat composition

The wax pattern or cluster is first inspected to remove dirt, flakes and other objects which may have adhered to the surfaces of the wax patterns and which, if allowed to remain, would impair the preparation of a good mold and lead to an imperfect casting. The cleaned cluster is immersed into the dip coat composition, while being stirred, to cover all of the surfaces of the cluster with the exception of the lip of the pouring spout. To promote the elimination of air pockets, it is desirable to rotate the cluster while immersing in the dip coat composition. Instead of immersing the pattern in the stirred slurry of the dip coat composition for coverage of the surfaces of the pattern, the dip coat composition can be applied to achieve the desired coverage by spraying the dip coat composition onto the surfaces of the pattern. By this latter spraying technique the casting weight of the dip coat composition can be increased or decreased, as desired, by comparison with the amount of coating retained on the surfaces by immersion.

When fully coated, the pattern or cluster is suspended to drain excess dip coat composition. During drainage, the cluster can be inspected to detect air pockets which can be eliminated by addressing a stream of air onto the uncoated portions and thereafter allowing the slurry of the dip coat composition to flow onto the uncovered areas. While the cluster is being drained, it should be held in different planes designed to achieve uniform coating on all surfaces. In general, drainage should be completed within a few minutes but, in any event, in less time than would allow the dip coat composition to gel or dry whereby the surface would not retain stucco in the desired uniform arrangement.

2. Stuccoing

After the cluster has been allowed to drain for a short time and while the surface is still wet with the dip coat composition, the surface is stuccoed with particles of graphite having the following particle size distribution:

| Tyler screen size: | Percent retained on screen |
|---|---|
| 65 | 62 |
| 100 | 29 |
| 150 | 7 |
| 200 | 1 |
| Pan | 1 |

The graphite will hereinafter be referred to as having a particle size of more than 150 mesh but less than 35 mesh. The particles of graphite are caused to flow over the surface of the pattern until the wet surface is substantially completely covered.

After the uniformity of coating has ben achieved with the dip coat composition, the stucco is sprinkled onto the wet surface while constantly changing the position of the cluster substantially uniformly to cover the dip coating with a layer of stucco, while at the same time minimizing flow of the dip coat composition whereby non-uniformities might otherwise develop. In practice, the graphite particles are rained down from above through a screening member which is constantly fed from a vibratory conveyor. The particles of graphite adhere to the wet coating and become partially embedded therein to become integrated with the coating formed on the wax patterns.

If the dip coat composition is adjusted to enable gellation to take place within a very short period of time, the stuccoed cluster need not be set aside for drying. However, it is preferred to slow the gellation of the dip coat so that sufficient leeway is available for the desired drainage and stucco application. Thus it is desirable to provide for an air dry for a time ranging from 10–25 minutes. It will be understood that the drying time may be extended indefinitely beyond the times described without harm to the structure. If desired, drying of the combined coatings can be accelerated in a humidity controlled air circulating chamber heated to a temperature up to about 100° F.

The particle size of the graphite stucco is not critical since the particle size of the graphite can be varied over a fairly wide range. However, for best practice of this invention, it is preferred to make use of graphite having a particle size greater than 150 mesh and less than 20 mesh.

The operation is repeated, that is the pattern is again dipped into the dip coat composition and covered with fine particles of graphite to build up a second composite layer. In the preferred practice of this invention, it is desired, though not essential, to precede the immersion of the coated pattern in the dip coat composition with a prewetting step in which the prewetting composition employs substantially the same formulation as the dip coat composition with the exception that a lower viscosity is employed occasioned by the formulation to include additional amounts of water sufficient to reduce the total solids to about 25–75% of the solids in the dip coat composition. Thus the coated pattern is first submerged in the prewet composition more completely to penetrate and wet out the coated surface followed almost immediately by submersion in the dip coat composition after which the steps of drainage, stuccoing with the fine particles of graphite, and drying are carried out. Thus the layers become better integrated one with the other to produce a strong and composite structure.

The steps of prewetting, if used, dip coating, stuccoing with the dry particles of graphite and drying can be repeated several times until a mold of the desired thickness and strength has been built up about the disposable pattern or cluster.

While a mold of higher strength will be secured if the graphite particles of the type having a mesh size within the range of more than 150 but less than 20 are used throughout to build up the mold, it is preferred to make use of particles of graphite of larger dimension for use as the stucco after the second coat and preferably after the fifth coat. For such outer layers or coatings, graphite having the following particle size distribution may be employed:

| Tyler screen size: | Percent retained on screen |
|---|---|
| 8 | 1 |
| 10 | 14 |
| 20 | 65 |
| 35 | 18 |
| 65 | 1 |
| Pan | 1 |

The foregoing will hereinafter be referred to as having a particle size greater than 35 mesh but less than 8 mesh.

Instead of fabricating the mold entirely of graphitic material, the inner portion of the mold (less than ½ the mold cross section) immediately adjacent the disposable pattern may be fabricated substantially entirely of graphitic materials while the major cross section, forming the outer portion of the mold, is formulated of the conventional ceramic materials in the dip coats and stucco coats, or of dip coats formulated to contain colloidal graphite as the binder component along with conventional ceramic flours, as will hereinafter be described, with the stucco comprising ceramic material, such as zircon, alumina, silica and the like.

The steps of prewetting, if used, dip coating and stuccoing with the described graphite systems can be repeated one or more times, but, in accordance with the above mentioned further modification, after about the second, third or fourth cycle, the remainder forming the major cross section of the shell is built up by the use of dip coat compositions and stuccos of the inorganic or ceramic type. The following will illustrate dip coat compositions and stucco which may be used to build up the remainder of the shell mold:

Dip coat composition:
  Colloidal silica (30% grade—specific gravity 1.198) _____cc__ 8000
  Zircon (99% through 325 mesh) ___pounds__ 165
  Water _____cc__ 6150
  Sodium fluoride _____grams__ 110
Stuccoing composition:
  Tabular alumina in the form of coarse particles greater than 14 mesh with less than 10% through 50 mesh.

Instead of making use of a dip coat composition formed substantially entirely of the ceramic materials or inorganic materials as described above, certain advantages are derived, as will hereinafter be pointed out, by the use of a dip coat composition for the subsequent coats wherein colloidal graphite is retained as a component in combination with ceramic inorganic materials conventionally employed as the flour and the like in the dip coat composition. The following will represent a dip coat composition of the type described:

Distilled water _____pounds__ 11
Dispersion of colloidal graphite (22%) in water _____pounds__ 8.8
Zirconia of less than 325 mesh _____do____ 88
Anionic wetting agent (solium heptadecyl sulphate) _____cc__ 200

The foregoing dip coat and stucco compositions can be built up onto the previously formed layers of the graphitic materials by procedures as previously described.

A mold having a wall thickness of from ¼ to ½ inch is usually sufficient although molds of greater wall thickness can be formed where greater strengths are desired for use in the molding of larger castings. The normal wall thickness of mold can be achieved with the compositions described with from 5–10 cycles of dip coating, stuccoing, and drying. Where the inner portions are to be formed of graphite and the outer portions with ceramic materials in accordance with the described modification, the normal wall thickness of the mold can be achieved with the compositions described including from two to four cycles of dip coating, stuccoing and aging. Instead of alumina as a stucco, use can be made of Alundum, zircon, silica and the like.

3. Dewaxing

After the composite mold has been produced, the disposable pattern is removed to leave a mold cavity in which the material to be molded may be cast. Pattern removal, hereinafter referred to as dewaxing can be achieved in a number of ways:

(a) Use can be made of flash dewaxing wherein the composite is heated to an elevated temperature far above the melting point temperature of the wax or plastic. In a preferred process of flash dewaxing the composite is heated to a temperature above 800° F. and preferably to a temperature within the range of 800°–2200° F. for a time sufficient to eliminate the wax and to fire the mold. When the mold is exposed to a temperature in excess of 800° F. during dewaxing or firing it is desirable to enclose the mold within a reducing or non-oxidizing atmosphere otherwise the graphite binder will be burned out.

(b) Dewaxing can be carried out by a process referred to as "hot sand dewaxing" wherein sand heated to a temperature of 400–800° F. is arranged to surround the composite for intimate contact with the outer surfaces thereof whereby rapid heat transfer is achieved into the interior to melt out the wax. The hot sand can be poured about the mold or the mold can be buried in the hot sand. Instead of sand use can be made of a metal or alloy system of low melting point such as the cerro alloys, low eutectic alloys and the like.

(c) Dewaxing can be carried out with steam when the wax patterns are formed of a material having a melting point range below 200° F. For such purpose the composite can be housed within a steam chamber or autoclave or else steam at relatively high pressure can be addressed onto the composite while it is suspended with the spout extending downwardly for drainage of the molten wax.

(d) Dewaxing can be carried out in an oven heated to a temperature above the melting point temperature of the wax but below the oxidizing temperature of the graphite or preferably at a temperature within the range of 250°–850° F. in a process referred to as "low temperature dewaxing" without the need to maintain a reducing atmosphere.

4. Firing of the molds

The molds are thereafter fired by heating to a temperature above 800° F. and preferably to a temperature within the range of 800°–2200° F. Firing can be achieved by exposure of the mold to firing temperature for 15 or more minutes but it is preferred to fire the mold at a temperature within the range of 800°–2200° F. for a time within the range of 15–120 minutes. Firing can be carried out concurrently with dewaxing when use is made of a high temperature dewaxing method as described in (a) above. Since graphite will be consumed when heated to a temperature above 800° F. in an oxidizing atmosphere high temperature dewaxing and firing are carried out in an inert atmosphere and preferably in a reducing atmosphere. For this purpose use can be made of hydrogen or an atmosphere composed of carbon monoxide.

Because of the thinness of the walls of the mold and the high heat conductivity of the graphite heat penetrates rapidly through the mold to cause the wax portion of the pattern immediately adjacent the interior surfaces of the mold to be reduced to a molten state even before the remainder of the pattern has been heated to elevated temperature. Thus the liquified portion leaves sufficient room to permit expansion of the remainder of the wax pattern when the cross section of the pattern is heated to elevated temperature thereby to eliminate strain on the mold which might otherwise lead to breakage.

The fired mold is cooled from firing temperature to a safe temperature below 800° F. before exposure to atmospheric conditions for continued cooling or for further processing.

The above examples and procedures have been provided in order to indicate the type of molds used for achieving the objects of this invention. Specifically the molds described have been found to be extremely well suited for the casting of articles formed of glass and ceramic. For a more detailed description of such molds reference is made to copending applications Ser. No. 310,261 filed Sept. 20 1963 now Patent No. 3,241,200, issued Mar 22, 1966, and Ser. No. 310,354, filed Sept. 20, 1963, now Patent No. 3,266,106, issued Aug. 16, 1966.

In the casting of molten materials such as high alloy metals and the like, it is preferred to densify the interior wall portions of the graphite mold defining the mold space to minimize flow of molten material into or through the mold. For this purpose, the mold can be impregnated with a graphite formulated in an impregnating composition represented by the following:

Impregnating composition A:
  Colloidal graphite _____pounds__ 0.5
  Acetone _____do____ 11.5

Impregnating composition B:
  Collodial graphite (22% solids in aqueous medium—less than 1 micron) ____pounds__ 2
  Distilled water _____do____ 10
  Anionic wetting agent _____cc__ 25

For purposes of impregnation, only colloidal graphite of less than 1 micron should be used. Impregnation can be achieved merely by dipping the fired mold in the impregnating composition whereupon the composition soaks rapidly into the walls of the mold. Impregnation is followed by drying. As many as from 1 to 10 or more impregnations can be effected whereby the pores of the fired mold are increasingly filled with graphite by each impregnation. After one or a series of such impregnations, with intermittent drying, the mold should again be fired at a temperature within the range of 800–2200° F. in a reducing or inert atmosphere for about 15–120 minutes. The resultant product, upon cooling, will be found to be of such hardness and density as to give a metallic ring.

5. Casting of glass and ceramic articles

The molten glass or ceramic can be poured directly into the mold cavity of shells fabricated in accordance with the procedures above described. The fired shell possesses strength sufficient to maintain mass integrity during pouring of the molten material to thereby avoid the necessity for supporting the shell. When molds of the type described are employed, several advantages are presented due to the fact that the molds are light in weight, require less material, can be heated rapidly to a desired temperature for casting, provide for rapid cooling of the cast material, have better tear strength, and the molds can be completely inspected prior to glass pouring to reduce scrap losses.

The casting of glass and ceramic articles through the use of the molds of this invention also provides other extremely important advantages. Specifically, Pyroceram and other high melting point glasses and ceramics can be cast into quite intricate shapes with high dimensional accuracy. Thus, the use of shell molds of the type described permits the formation of mold interiors having very irregular contours and having large and small cavity portions within the same mold. The molten glass and ceramic can be introduced into the shells and will reach all cavity portions therein while assuming precisely even the most irregular shapes. This can be accomplished in combination with the economies realized by the instant technique and, accordingly, this invention provides extremely important advantages over prior glass and ceramic molding procedures.

Because of the high temperatures involved in the casting of glass and ceramics, it is preferred that the molds be preheated prior to pouring of the molten material. The preheating, when carried out below about 800° F., can be undertaken under oxidizing conditions. If temperatures in excess of 800° F. are necessary, it is essential that vacuum, inert, or reducing atmospheres be provided. This is necessary since the graphite will burn when exposed to oxidizing conditions for any significant length of time. The actual casting operation is preferably carried out in an air atmosphere although vacuum or other inert conditions are contemplated.

The cast ceramic articles can be removed from the shell by causing the shell to disintegrate by impact or vibration to thereby free the cast material from the shell materials. In addition, removal of the shell can be accomplished because of the presence of graphite in the mold. Thus, the shell may be cooled after casting beginning at a temperature above 800° F. in an oxidizing atmosphere whereby carbon will be consumed. The strength characteristics and self-sufficiency of the shell will then be materially reduced whereby removal of the shell is simplified. It is also contemplated that the loss of strength could be accomplished by burning graphite from the shell during exposure of the shell to elevated temperatures in an oxidizing atmosphere.

Stuccoing and dip coating can also be undertaken in alternating fashion as above described. It is further contemplated that inorganic or ceramic type materials can be utilized in achieving the outer wall thickness. Reference is made to the techniques described in Patent No. 2,961,751 for this aspect of the shell formation. The dewaxing, firing and casting operations can also be conducted as described above.

The molds of this invention and the methods involving their use are of particular value due to the quality of the finished glass and ceramic articles. It has been found that the fine particle size which characterizes the initial dip coat compositions provides interior molding surfaces which are extremely smooth. These surfaces are also extremely durable when exposed to the molten ceramic. Accordingly, the ultimate castings produced are characterized by high finished surfaces. Since glass and ceramic articles of this high quality can be prepared in accordance with this invention, that is, by means of low-cost and efficient procedures, it is obvious that an extremely important advance in the production of such articles has been accomplished.

It is also contemplated that the dip coatings described above could be applied and the wax pattern thereafter stuccoed with ceramic materials. Alundum, having particle size of less than 20 mesh but greater than 150 mesh and preferably less than 50 mesh with only 3% passing through 100 mesh and with more than 90% passing through between 60 and 80 mesh, is particularly suitable for this purpose. In addition, alumina, zircon, silica and other known stuccoing materials may be employed for this purpose. This aspect of the invention also contemplates the alternating application of the dip coat and stuccoing material in accordance with the techniques set forth above.

The solidified glass and ceramic articles can be removed from the molds by conventional techniques such as impacting and shaking of the assembly to break up the mold and to free the casting. Thereafter, any material retained on the surface of the molded article can be removed by blasting techniques.

The mold of this invention is also capable of being cleanly and substantially completely removed from the molded article by exposing the assembly to high temperatures for a significant period in oxidizing atmosphere, such as air. This procedure causes the graphite to be consumed whereby the mold portions can be easily and cleanly broken away.

It will be understood that changes and modifications may be made in the details of the subject matter described which do not depart from the spirit of this invention particularly as defined in the following claims.

That which is claimed is:

1. In a method for molding articles of glass and ceramic materials and the like comprising forming a disposable pattern corresponding substantially to the shape of the article to be molded, wetting the surface of said pattern with an aqueous dip coat, covering the surface with a stuccoing material while the pattern is wet with the dip coat to build up a shell having a graphitic interior surface, removing the pattern material from within said shell, introducing molten article forming material into said shell, solidifying said material in the shell, and thereafter removing said shell from around said material, the improvement wherein (a) said dip coat comprises an aqueous composition having a solids content of at least 0.5 percent by weight of colloidal graphite, the colloidal graphite including at least 50 percent colloidal graphite of less than one micron in dimension with the balance colloidal graphite of less than 20 microns in dimension, and the balance of the solids content consisting essentially of graphite flour of less than 200 mesh; and wherein (b) the stucco applied over said first dip coat comprises graphite particles, (c) said first dip coat and stucco layers being alternately applied to provide at least about ½ the cross section of the shell.

2. A method in accordance with claim 1 including the steps of applying alternating dip coats and stucco layers of ceramic particles to complete the cross section of said shell.

3. A method in accordance with claim 1 in which the colloidal graphite comprises between 1.5 and 10 percent by weight of the graphite solids.

4. A method in accordance with claim 1 wherein said colloidal graphite comprises from 0.5 to 5.0 percent by weight of the dip coat.

5. A method in accordance with claim 1 wherein the colloidal graphite is present in an amount between 1.5 and 10 percent by weight of the graphite particles forming the inner portion of the mold.

6. A method in accordance with claim 1 wherein the graphite stucco comprises particles of less than 30 mesh but more than 150 mesh.

References Cited

UNITED STATES PATENTS

| | | | |
|---|---|---|---|
| 276,924 | 5/1883 | Swan | 65—26 |
| 1,229,324 | 6/1917 | Rosenblum | 65—32 |
| 2,401,760 | 6/1946 | Heyroth | 264—221 |
| 2,441,695 | 5/1948 | Feagin et al. | 264—221 X |
| 2,628,394 | 2/1953 | Valyi | 264—221 X |
| 2,679,080 | 5/1954 | Olsen | 65—32 X |
| 3,241,200 | 3/1966 | Lirones | 65—374 XR |
| 3,266,106 | 8/1966 | Lirones | 65—374 XR |

FOREIGN PATENTS 132,715    5/1900    Germany.

DONALL H. SYLVESTER, *Primary Examiner.*

F. W. MIGA, *Assistant Examiner.*

U.S. Cl. X.R.

65—23, 26, 68, 60, 374, 375, 169, 144; 264—221; 117—169

UNITED STATES PATENT OFFICE
CERTIFICATE OF CORRECTION

Patent No. 3,420,644　　　　　　　　　　　　　　January 7, 1969

Nick G. Lirones

It is certified that error appears in the above identified patent and that said Letters Patent are hereby corrected as shown below:

Column 2, line 58, "of National Carbon Company)" should read -- of Acheson Industries, Inc.) --.

Signed and sealed this 21st day of April 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents